(12) United States Patent
Kim

(10) Patent No.: US 7,844,311 B2
(45) Date of Patent: Nov. 30, 2010

(54) MOBILE TERMINAL HAVING ACOUSTIC TRANSDUCER AND CONTROL METHOD THEREOF

(75) Inventor: Myoung-Jae Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 812 days.

(21) Appl. No.: 11/745,978

(22) Filed: May 8, 2007

(65) Prior Publication Data

US 2007/0263893 A1    Nov. 15, 2007

(30) Foreign Application Priority Data

May 10, 2006    (KR)  ............... 10-2006-0042128

(51) Int. Cl.
*H04B 1/08*    (2006.01)
*H04M 1/00*    (2006.01)

(52) U.S. Cl. ............. 455/575.1; 455/350; 455/569.1; 455/575.2; 379/420.01; 379/433.02; 379/433.03

(58) Field of Classification Search ....... 455/41.1–41.3, 455/90.3, 569.1, 575.1–575.4, 347–350; 379/420.01–420.04, 433.02–400.03
See application file for complete search history.

(56) References Cited

U.S. PATENT DOCUMENTS

| | | | | |
|---|---|---|---|---|
| 5,771,438 A | * | 6/1998 | Palermo et al. ............ 455/41.1 |
| 5,943,627 A | * | 8/1999 | Kim et al. ............... 455/569.1 |
| 6,047,064 A | * | 4/2000 | Lyons ..................... 379/446 |
| 6,118,882 A | * | 9/2000 | Haynes .................... 381/374 |
| 7,539,302 B2 | * | 5/2009 | Kulas .................. 379/433.02 |
| 7,565,187 B1 | * | 7/2009 | Dynok et al. ............ 455/575.6 |
| 2003/0096603 A1 | | 5/2003 | Chen | |
| 2004/0204194 A1 | | 10/2004 | Akai et al. | |
| 2005/0037782 A1 | | 2/2005 | Diethorn et al. | |
| 2005/0107131 A1 | * | 5/2005 | Abramov ................ 455/569.1 |
| 2007/0135185 A1 | * | 6/2007 | Dvorak et al. ........... 455/575.2 |

FOREIGN PATENT DOCUMENTS

GB    2295736    6/1996

* cited by examiner

*Primary Examiner*—Simon D Nguyen
(74) *Attorney, Agent, or Firm*—Lee, Hong, Degerman, Kang & Waimey (57) ABSTRACT

A mobile terminal having acoustic transducers and method for using the same are provided. The acoustic transducers are detachably mounted in a terminal body. When the acoustic transducers are mounted in the terminal body, they are operated as speakers, and when the acoustic transducers are separated from the terminal body, the acoustic transducers are operated as at least one of a wireless earphone and the microphone.

23 Claims, 7 Drawing Sheets

MOBILE TERMINAL HAVING ACOUSTIC TRANSDUCER AND CONTROL METHOD THEREOF

CROSS REFERENCE TO RELATED APPLICATION

Pursuant to 35 U.S.C. §119(a), this application claims the benefit of earlier filing date and right of priority to Korean Application No. 10-2006-0042128, filed May 10, 2006, the contents of which are hereby incorporated by reference herein in their entirety.

FIELD OF THE INVENTION

The present invention relates to a mobile terminal and, more particularly, to a mobile terminal that can be used as a speaker when mounted in a terminal body and can be used as a wireless earphone when separated from the terminal body.

DISCUSSION OF THE RELATED ART

Figure 1:
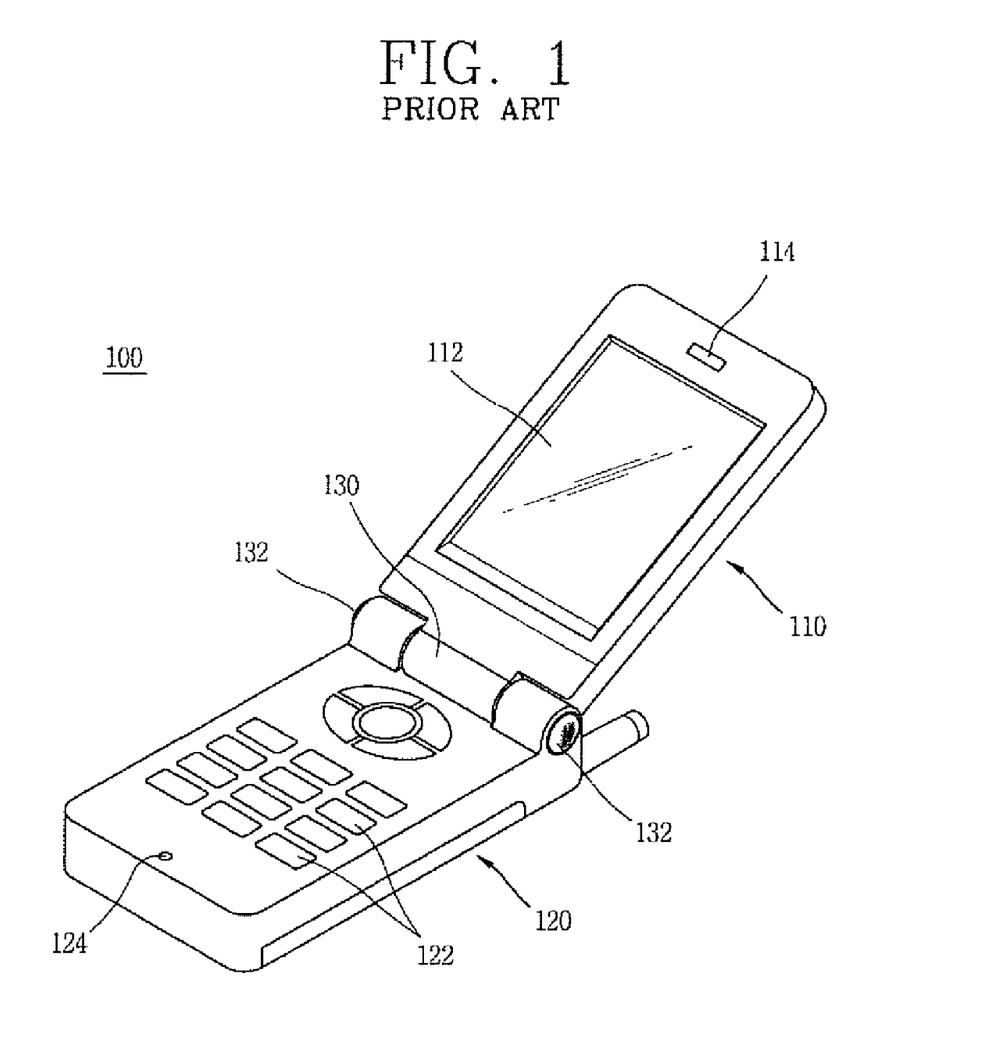
FIG. 1 is a perspective view of a conventional mobile terminal according to the related art.

FIG. 1 is a perspective view of the related art mobile terminal 100. The related art mobile terminal 100 includes a display unit 110 including a display 112 for displaying information, a terminal body 120 connected with the display unit 110 such that it can be opened and closed and having a keypad 122 mounted on its front surface for inputting information, a hinge part 130 rotatably connecting the display unit 110 and the terminal body 120, and a pair of speakers 132 fixed at both ends of the hinge part 130 and generating a sound.

A microphone 124 is mounted at a lower end of the terminal body 120 and a receiver 114 for generating a sound in a call mode is mounted on the display unit 110.

When a user of the mobile 100 terminal enjoys music, the mobile terminal implements three-dimensional stereo sound through the pair of speakers 132, and when the mobile terminal is in the call mode, the display unit 110 is opened and implements the call mode by using the microphone 124 and the receiver 114.

However, the related art mobile terminal 100 has a problem because the pair of speakers are fixed at the terminal body, the user must use a separate earphone or headset to make and receive a call while driving, for example. Even if the user achieves mobile freedom by using the headset along with the mobile terminal 100, the user must separately carry the headset and plug it into the mobile terminal each time the user wishes to make or receive calls. In addition, when the user changes the mobile terminal 100 to the call mode while he/she is enjoying music, the user must hold the terminal to perform call communication by using the receiver and microphone mounted on the terminal, causing user inconvenience.

SUMMARY OF THE INVENTION

An object of the present invention is to provide a mobile terminal having acoustic transducers that can be used as a speaker when mounted in the terminal body and that can be used as a wireless earphone and microphone when separated from the terminal.

In an aspect of the present invention, a mobile terminal, includes a terminal body; and a pair of acoustic transducers detachably mounted in the terminal body, wherein when the pair of acoustic transducers are mounted in the terminal body, each of the acoustic transducers is operated as one of a speaker and a microphone, and wherein when the acoustic transducers are separated from the terminal body each of the acoustic transducers are operated as one of a wireless earpiece and the microphone.

It is contemplated that one of the acoustic transducers is detachably mounted at one side of the terminal body and the other acoustic transducer is detachably mounted at another side of the terminal body. It is further contemplated that when the pair of acoustic transducers are mounted in the terminal body, both transducers are operated as speakers, and when the mobile terminal operates in a call mode one of the acoustic transducers is operated as the microphone and the other one is operated as the speaker.

It is contemplated that when the pair of acoustic transducers are separated from the terminal body, they are operated as wireless earpieces, and when the pair of transducers are separated from the terminal body and the mobile terminal is operating in a call mode, one acoustic transducer is operated as the microphone and the other acoustic transducers is operated as the wireless earpiece. It is further contemplated that when the pair of acoustic transducers are separated from the terminal body in a call mode, one of the acoustic transducers is operated as the wireless earpiece and microphone while the other acoustic transducers is operated as the wireless earpiece.

It is contemplated that each of the acoustic transducers include a sound input and output unit outputting sounds and converting sounds into electrical signals; and a main body part connected with the sound input and output unit and having a wireless communication module and a battery mounted therein. It is further contemplated that the mobile terminal further includes receiving ports formed at the terminal body to receive the acoustic transducers therein, wherein each receiving port includes a corresponding connection terminal electrically connecting an acoustic transducer and the terminal body.

It is contemplated that the connection terminals include a charging connection terminal for charging the battery of each of the acoustic transducers by using one of the power of the battery mounted in the terminal body and an extra power source connected with the mobile terminal. It is further contemplated that the mobile terminal further includes a locking part is formed between each acoustic transducer and the corresponding receiving port to prevent the acoustic transducers from being inadvertently released from the receiving ports, the locking part comprises a stopping protrusion disposed on an outer circumferential surface of the acoustic transducer and a stopping groove formed on an inner circumferential surface of the receiving port to allow the stopping protrusion to be stopped therein.

It is contemplated that mobile terminal further includes a control unit for operating the pair of acoustic transducers as a wireless headset including an earphone and a microphone when the mobile terminal is operating in a call mode and the acoustic transducers are separated from the terminal body. It is further contemplated that the control unit includes a separation detection unit detecting separation of at least one of the acoustic transducers is separated from the terminal body; a call signal detecting unit for detecting whether a call signal is generated; and a controller controlling the operation of the acoustic transducers according to signals received from the separation detection unit and the call signal detection unit.

In another aspect of the present invention, a method for controlling a plurality of acoustic transducers in a mobile terminal is provided, the method includes: controlling the plurality of acoustic transducers to operate as speakers when the acoustic transducers are mounted in a body of the mobile terminal; operating the plurality of acoustic transducers as wireless earphones when the plurality of acoustic transducers are separated from the body; and operating at least one of the plurality of acoustic transducers as a wireless earphone and the at least one of the plurality of acoustic transducers as a microphone when the mobile terminal is changed to a call mode while the plurality of acoustic transducers are separated from the body.

It is contemplated that the plurality of acoustic transducers are formed as a pair, and when the mobile terminal is changed to the call mode while the acoustic transducers are separated from the terminal body, one of the acoustic transducers is operated as the wireless earphone and the other of the acoustic transducer is operated as the microphone. It is further contemplated that the plurality of acoustic transducers are formed as a pair, and when the mobile terminal is changed to the call mode while the acoustic transducers are separated from the terminal body, one of the acoustic transducers is operated as the wireless earphone and the microphone and the other acoustic transducer is operated as the wireless earphone.

It is contemplated that the method further includes: generating a signal to alert a user when the mobile terminal is changed to a call mode; and operating each of the plurality of acoustic transducers as one of the wireless earphone and microphone after the user is alerted, wherein the call signal is one of a certain number of audible sounds, an audible sound for a predetermined length of time and a vibration sound. It is further contemplated that when the mobile terminal is changed to a call mode and a user initiates a call, the plurality of acoustic transducers is operated as the wireless earphone and at least one of plurality of transducers is operated as the microphone.

It is contemplated that when the plurality of acoustic transducers are separated from the terminal body, in the call mode, one of the acoustic transducers is operated as the wireless earphone and the other is operated as the microphone according to a user selection. It is further contemplated that when the pair of acoustic transducers are separated from the terminal body, in the call mode, one of the acoustic transducers is operated as both the wireless earphone and the microphone and the other transducer is operated as the wireless earphone according to a user selection.

In another aspect of the present invention, a mobile terminal includes: a terminal body; and a first headset detachably mounted in the terminal body, the first headset comprising a speaker assembly outputting audio information to a user, wherein the first headset outputs audio information when mounted in the body and operates as a wireless headset when separated from the terminal body.

It is contemplated that the mobile terminal further includes a second headset detachably mounted in the body, wherein at least one of the first and second headsets further comprises a microphone assembly to receive audible information from the user when the mobile terminal is configured to operate in a wireless communication mode. It is further contemplated that at least one of the first and second headsets is configured to form an earpiece assembly including the speaker assembly and microphone assembly.

It is contemplated that the first headset is configured to operate as the wireless earpiece and microphone when the mobile terminal operates in the wireless communication mode and the first headset is separated from the terminal body, and wherein the second headset is configured to operate as a second wireless earpiece. It is further contemplated that at least one of the first and second headsets further includes a main body connected with the speaker assembly and the microphone assembly, the main body including a wireless communication module and a battery mounted therein.

It is contemplated that the mobile terminal further includes at least one receiving port formed at the terminal body and receiving the at least one of the first and second headsets therein. It is further contemplated that the at least one receiving port includes a connection terminal electrically connecting the at least one of the first and second headsets and the terminal body.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE INVENTION

A mobile terminal according to exemplary embodiments of the present invention will now be described with reference to the accompanying drawings.

Figure 2:
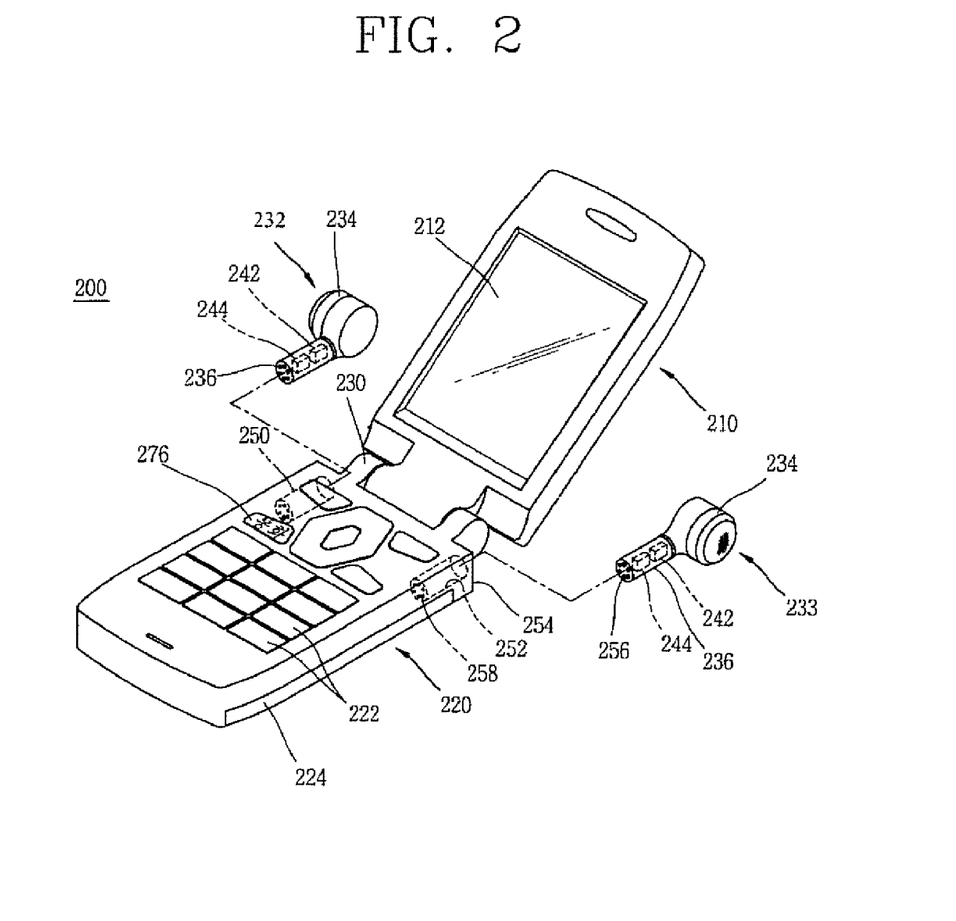
FIG. 2 is a perspective view of a mobile terminal according to a first embodiment of the present invention.

FIG. 2 is a perspective view of a mobile terminal 200 according to a first embodiment of the present invention.

The mobile terminal 200, according to the first embodiment of the present invention, includes a display unit 210 having a display 212 for displaying information, a terminal body 220 rotatably connected with the display unit 210 and including a keypad 222 mounted on its front surface and inputting information and a battery 224 mounted on its rear surface, and acoustic transducers 232 and 233 detachably mounted at the terminal body 220.

A hinge part 230 is formed between the display unit 210 and the terminal body 220 to support the display unit 210 to be relatively rotatable with respect to the terminal body 220.

As illustrated in FIG. 2, the mobile terminal 200 is a folder type mobile terminal in which the display unit 210 and the terminal body 220 are rotatably connected by the hinge part 230. However, the present invention can be applicable to any type of mobile terminal such as a bar type mobile terminal in which both the display and the keypad are provided at the terminal body, a slide type mobile terminal in which the display is slidably moved with respect to the terminal body, and a swivel type mobile terminal in which the display is slideably moved.

The acoustic transducers 232 and 233 of the present invention have been configured to perform both a microphone function and a speaker function. The transducers 232 and 233 can selectively implement one of a speaker for emanating a sound and a microphone for converting sound waves into electrical signals. For example, the microphone senses small vibrations of the user's vocal cords when generated through a vibration plate, amplifies them and converts them into electrical signals, and the speaker emanates the sound of the signals from the vibration plate.

Because the acoustic transducers 232 and 233 are in direct contact with the user's ear, an external noise can be reduced while a natural sound can be heard from the transducers 232 and 233. The acoustic transducers 232 and 233 are adapted to provide user wearing comfort.

The acoustic transducers 232 and 233 refer to a first acoustic transducer 232 mounted at the left side of the terminal body 220 such that it can be removed, and a second acoustic transducer 233 removably mounted at the right side of the terminal body 220. When the mobile terminal is changed to a call mode while the user is using the earphone function and the pair of acoustic transducers 232 and 233 are separated from the terminal body 220, one acoustic transducer 232 is operated as the earphone while the other acoustic transducer 233 is operated as the microphone.

In a another embodiment of the present invention, when the mobile terminal 200 is changed to the call mode while a wireless earphone function is being performed, one of the acoustic transducers is operated as the wireless earphone and the microphone and the other is operated as the wireless earphone.

For example, one acoustic transducer is used for the call mode for transmitting and receiving voice, and the other transducer is used to continuously perform the operation of the wireless earphone prior to entering the call mode. In detail, while the user is enjoying music with the pair of acoustic transducers 232 and 233 operated as wireless earphones, when the mobile terminal 200 is changed to the call mode, one acoustic transducer 232 transmits and receives voice and the other acoustic transducer 233 continuously emanates music. Accordingly, the user can continue enjoying music during call communication.

When the acoustic transducers are mounted in the terminal body 220, they are used as speakers to emanate sound externally. The acoustic transducers 232 and 233 include a sound input/output unit 234 having a vibration plate for performing transmission and reception, and a main body part 236 connected with the sound input/output unit 234 and allowing a wireless communication module 242 and a battery 244 to be mounted therein.

The main body part 236 is formed in a bar type such that it extends in a vertical direction from a rear surface of the sound input/output unit 234. The terminal body 220 includes receiving ports 250 and 252 in which the acoustic transducers 232 and 233 are received such that they can be withdrawn. The receiving ports 250 and 252 are a first receiving port 250 formed in a lengthwise direction at the left side of the terminal body 220 and receiving the first acoustic transducer 232 and a second receiving port 252 formed in a lengthwise direction at the right side of the terminal body 220 and receiving the second acoustic transducer 233.

Figure 3:
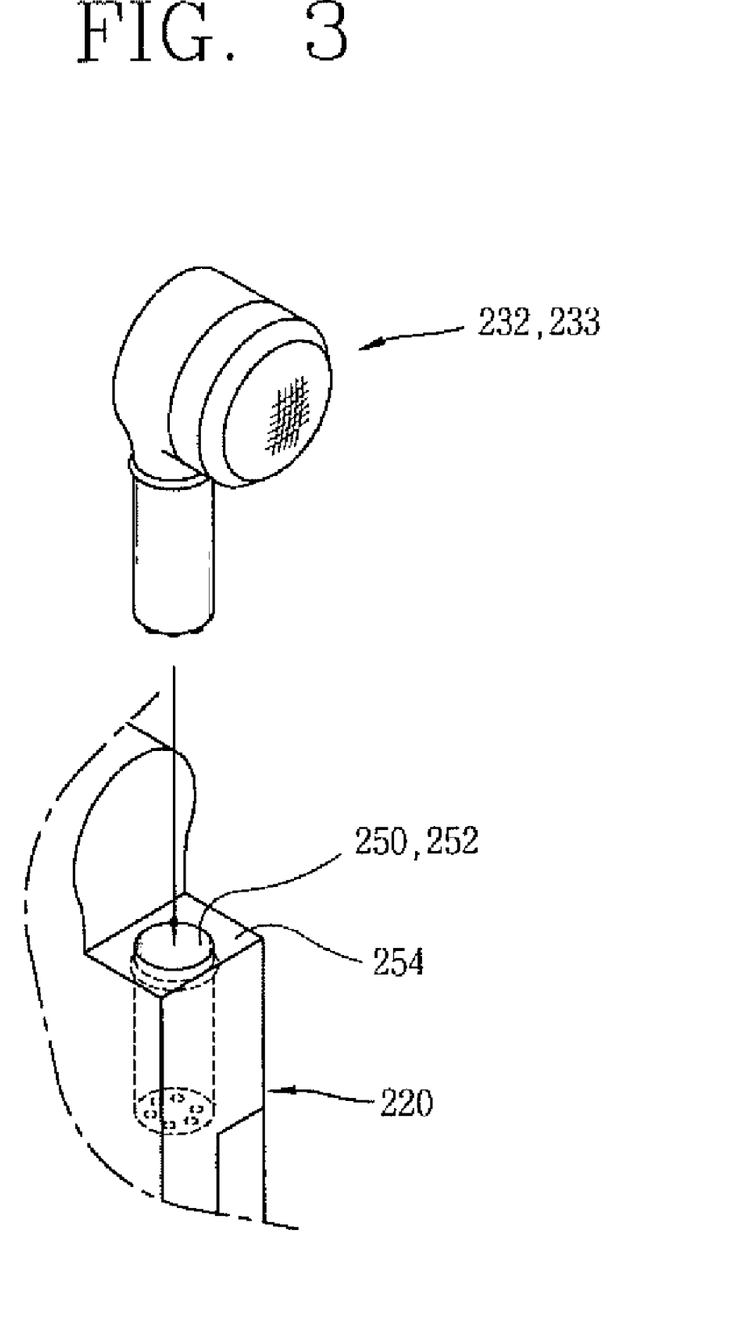
FIG. 3 is a partial cut-out illustrating a mounting structure for the acoustic transducers of the mobile terminal of FIG. 2.

FIG. 3 is a partial cut-out illustrating a mounting structure for the acoustic transducers 232 and 233 of the mobile terminal 200. The receiving ports 250 and 252 are formed with their upper end opened to allow the acoustic transducers 232 and 233 to be retracted into or protracted from the terminal body 220 in the lengthwise direction. Mounting parts 254 are formed at both ends of the hinge part 230 to allow the sound input/output unit 234 to be mounted thereon.

Figure 4:
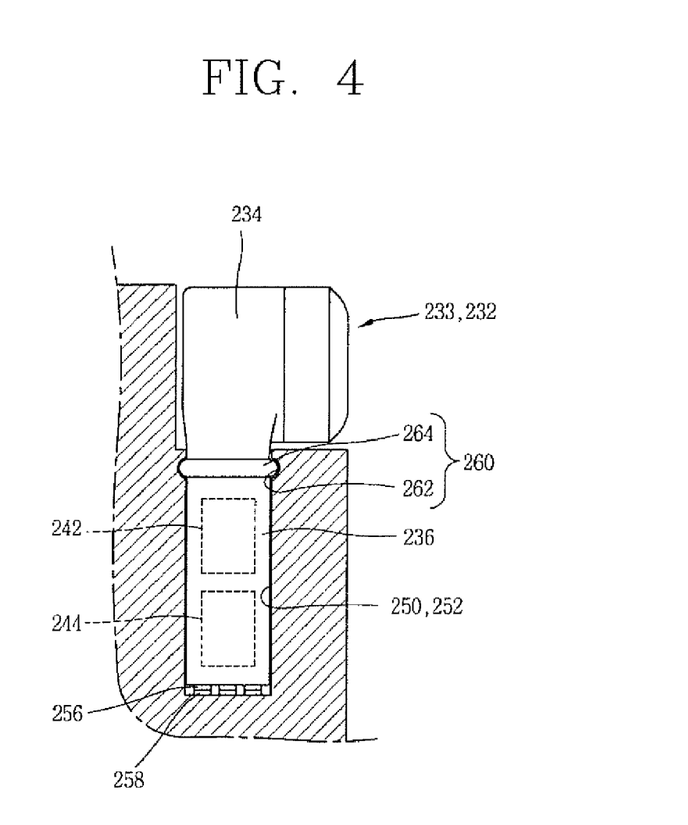
FIG. 4 is a sectional view illustrating an acoustic transducer received in a receiving port according to the first embodiment of the present invention.

FIG. 4 is a sectional view illustrating an acoustic transducer 232 and 233 received in a receiving port 250 according to the first embodiment of the present invention. A first connection terminal 256 is formed to be exposed on the main body part 236 and a second connection terminal 258 is mounted within the receiving ports 250 and 252 such that it contacts with the first connection terminal 256 and electrically connects the speakers 232 and 233 and the terminal body 220.

Referring to charging of the battery 244 installed within the acoustic transducers 232 and 233, when the acoustic transducers 232 and 233 are mounted in the receiving ports 250 and 252 of the terminal body 220, the first and second connection terminals 256 and 258 connected with each other, and accordingly, the battery 244 is charged by power of a battery 224 mounted in the terminal body 220. Namely, the connection terminals 256 and 258 include a charging connection terminal.

A locking part 260 is formed between the acoustic transducers 232 and 233 and the receiving parts of the terminal body 220 to prevent the acoustic transducers 232 and 233 from being released from the receiving ports 250 and 252 when the acoustic transducers 232 and 233 are mounted in the receiving ports 250 and 252.

The locking part 260 includes a stopping protrusion 264 protruded in a band type in a circumferential direction on an outer circumferential surface of the main body part 236 of the acoustic transducers 232 and 233 and a stopping groove 262 formed circumferentially on an inner circumferential surface of the receiving ports 250 and 252 and allowing the stopping protrusion 264 to be retained therein.

When the acoustic transducers 232 and 233 are received in the receiving ports 250 and 252, the stopping protrusion 264 of the locking part 260 is retained in the stopping groove 262 to thereby prevent the acoustic transducers 232 and 233 from being released from the terminal body 220. When a detaching force is applied to the acoustic transducers 232 and 233, the stopping protrusion 264 is released from the stopping groove 262 and thus the acoustic transducers 232 and 233 can be removed from the terminal body 220.

In an alternative embodiment, the locking part 260, comprises a push type locking mechanism can be used in which the acoustic transducers 232 and 233 are pressed in the direction that they are received in the receiving parts, the acoustic transducers are locked in the receiving parts, and when the acoustic transducers are pressed again, they are unlocked. The locking mechanism is a typical structure, therefore a detailed description will be omitted.

Figure 5:
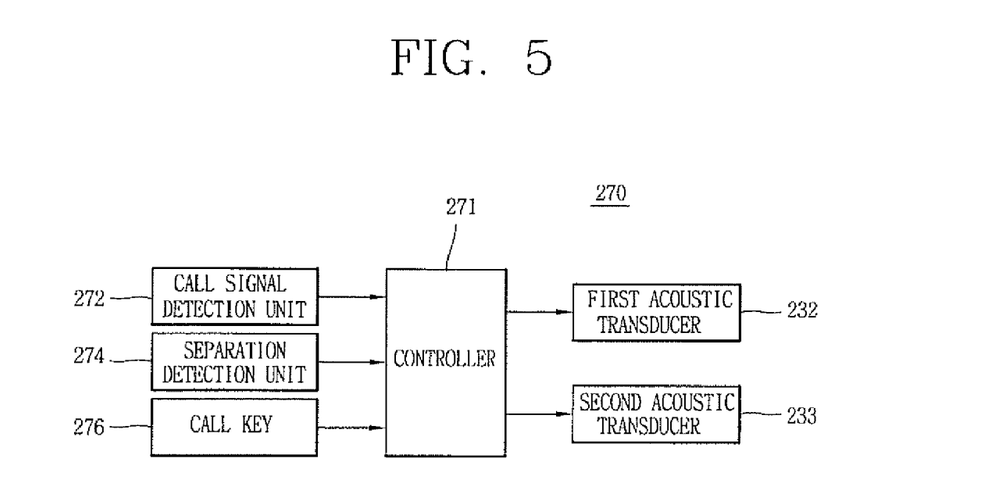
FIG. 5 is a schematic block diagram of a control unit of the mobile terminal according to the present invention.

FIG. 5 is a schematic block diagram of a control unit 270 of the mobile terminal 200 according to the present invention. The mobile terminal described above includes the control unit 270 for operating the acoustic transducers 232 and 233 as the wireless earphone and the microphone when the call mode is implemented in a state that the acoustic transducers 232 and 233 are separated from the terminal body 220.

As illustrated in FIG. 5, the control unit 270 includes a call signal detection unit 272 for detecting a signal when a call is received from outside; a separation detection unit 274 for detecting whether or not the acoustic transducers 232 and 233 are separated from the terminal body 220; a call key (send key) installed at the terminal body 220; a wireless communication module (not shown) mounted in the terminal body 220 and transmitting and receiving signals to and from a wireless communication module 242 of the acoustic transducers 232 and 233 when the acoustic transducers 232 and 233 are separated from the terminal body 220; and a controller 271 for controlling the acoustic transducers 232 and 233 according to signals inputted from the call signal detection unit 272, the separation detection unit 274 and the call key 276.

Figure 6:
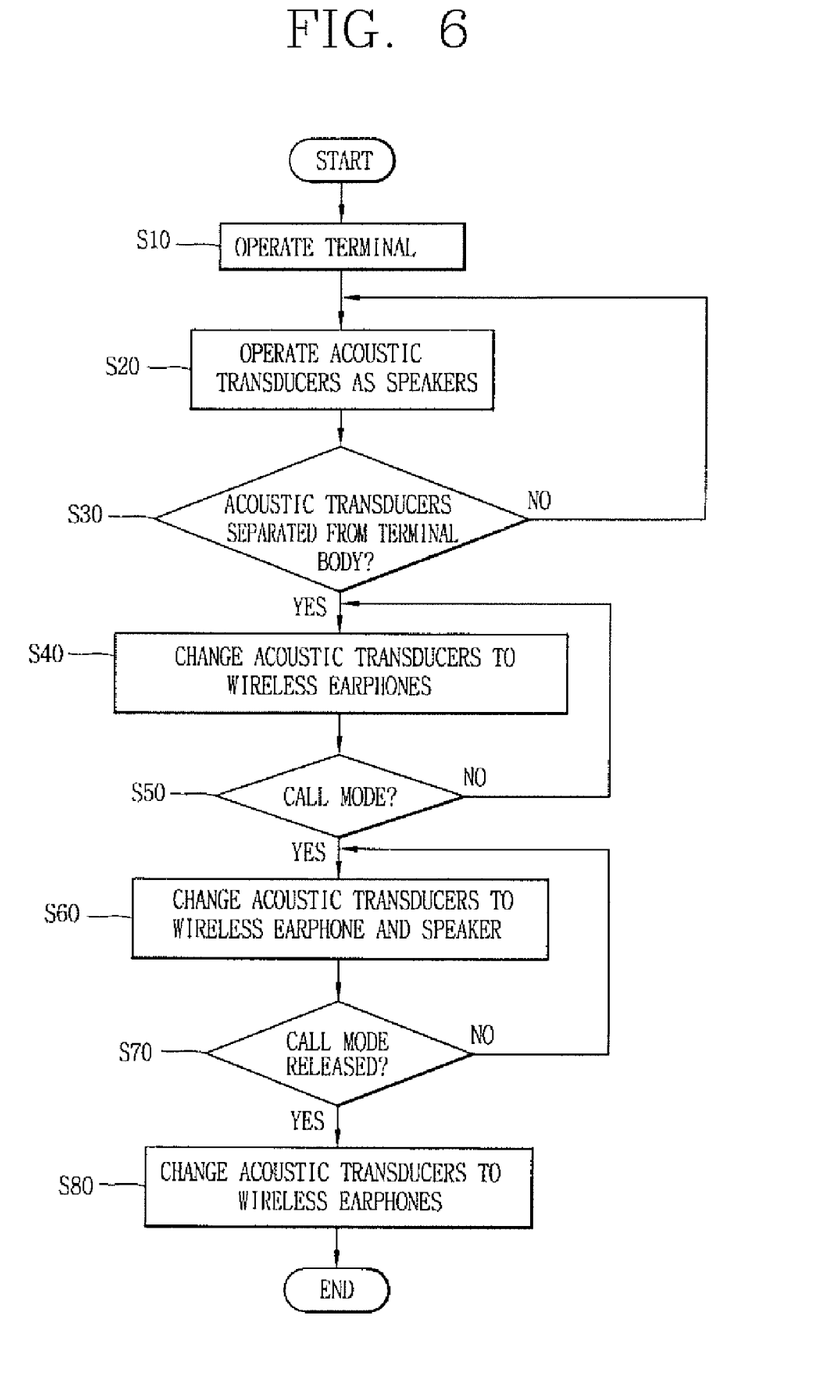
FIG. 6 is a flow chart illustrating a method for controlling a mobile terminal according to one embodiment of the present invention.

With reference to FIG. 6, a flow chart illustrating a method for controlling a mobile terminal 200 will be described as follows.

First, when the acoustic transducers 232 and 233 are received in the receiving ports 250 and 252, the acoustic transducers 232 and 233 are electrically connected with the terminal body 220 and the pair of acoustic transducers 232 and 233 are operated as speakers to generate a sound for allowing the user to enjoy music (steps S10 and S20). At this time, the battery 244 mounted in the acoustic transducers 232 and 233 are charged by power of the battery 224 mounted in the terminal body 220.

When the pair of acoustic transducers 232 and 233 are used as earphones, the acoustic transducers 232 and 233 are withdrawn from the receiving ports 250 and 252 of the terminal body 220. For example, when the pair of acoustic transducers 232 and 233 are pulled out in the lengthwise direction of the terminal body 220, the stopping protrusion 264 formed on the acoustic transducers 232 and 233 are released from the stopping groove 262 formed on the receiving ports 250 and 252, unlocking the acoustic transducers 232 and 233, so the acoustic transducers 232 and 233 are separable from the terminal body 220.

When the separation detecting unit 274 applies a separation signal of the acoustic transducers 232 and 233 to the controller 271, the controller 271 determines that the pair of acoustic transducers 232 and 233 have been separated from the terminal body 220 (step S30). The controller 271 then controls a sound volume of the pair of acoustic transducers 232 and 233 for use as wireless earphones (step S40) and the wireless communication module (not shown) mounted in the terminal body 220 and the wireless communication module 242 mounted in the acoustic transducers 232 and 233 transmit and receive signals to each other.

When the terminal 200 is changed to the call mode (S50) while the user is using the pair of acoustic transducers 232 and 233 as the wireless earphones by putting them in the ears, thereby separating them from the terminal body 220, the controller 271 operates the acoustic transducers 232 and 233 as the wireless earphone and the microphone (step S60). At this time, one of the pair of the acoustic transducers 232 and 233 is operated as the wireless earphone and the other is operated as the speaker.

That is, when a call is received, the call signal detecting unit 272 detects the received call and applies a corresponding signal to the controller 271. Then, the controller 271 provides an audible signal to the pair of acoustic transducers 232 and 233. The audible signal can be, but is not limited to, a bell sound signal wherein the user is alerted by a certain number of bell sounds or for a certain length of time so that the user recognizes the received call. When the bell sound signal output exceeds a certain number of times or when a certain time lapses after the bell sound signal is generated (S50), the controller 271 automatically operates one acoustic transducer 232 as the wireless earphone and the other acoustic transducer 233 as the microphone (S60), to allow the user to automatically receive the call while enjoying music.

Alternatively, when the user presses a call key 276 (S50) upon listening to the bell sound signal, the controller 271 changes the acoustic transducers 232 and 233 according to a signal applied from the call key 276, to operate as the wireless earphone and the microphone (S60).

When a call is received (S50), one acoustic transducer 232 can be operated as the wireless earphone and the microphone and the other acoustic transducer 233 can be operated as the wireless earphone. Accordingly, when a call is received while the user is enjoying music through the wireless earphone, the user can manipulate a certain button key to operate one acoustic transducer 232 as the wireless earphone and continue to enjoy music, and the other acoustic transducer 233 can be operated as the microphone and wireless earphone to carry out the call mode (S60).

When the user makes a call with the pair of acoustic transducers 232 and 233 operated as the wireless earphones in the ears, the user can press the call key 276 mounted on the terminal body 220 (S50), so that the controller 271 can operate one acoustic transducer 232 as the wireless earphone and the other acoustic transducer 233 as the microphone according to a press signal of the call key 276 (S60).

When the call mode ends (S70), the controller 271 changes the pair of acoustic transducers 232 and 233 to the earphones to successively perform the operation which was carried out in the previous stage of the call mode (step S80).

Figure 7:
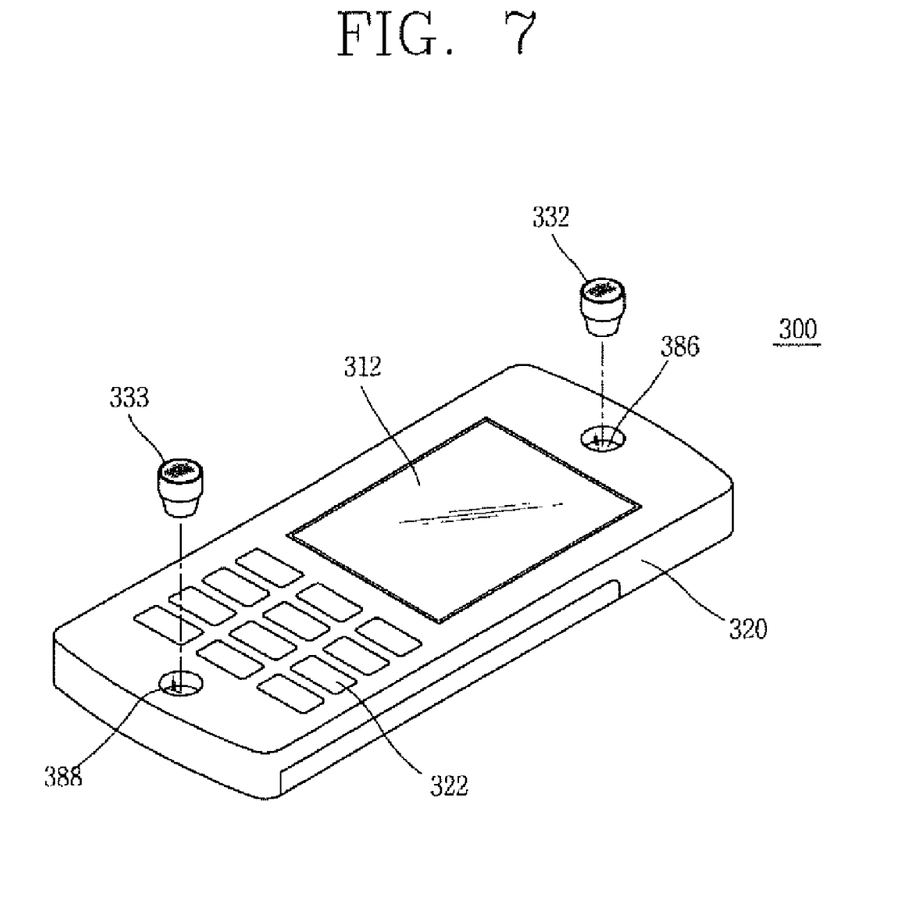
FIG. 7 is a perspective view of a mobile terminal according to a second embodiment of the present invention.

FIG. 7 is a perspective view of a mobile terminal 300 according to a second embodiment of the present invention.

A mobile terminal 300 according to the second embodiment of the present invention includes a terminal body 320 having a display 312 and a keypad 322 and a pair of acoustic transducers 332 and 333 detachably mounted in a lengthwise direction at both edge portions of the terminal body 320.

The acoustic transducers 332 and 333 have the same structure as that of the acoustic transducers 232 and 233 of the first embodiment of the present invention, so its description will be omitted.

A pair of receiving parts 386 and 388 are formed at both edge portions of the terminal body 320, in which the pair of acoustic transducers 332 and 333 are detachably mounted.

When the acoustic transducers 332 and 333 are mounted in the terminal body 320, they are operated as speakers to emanate sound, and when the mobile terminal 300 is in a call mode, one of the acoustic transducers 332 and 333 is operated as a speaker and the other is operated as a microphone to implement the call mode. Thus, because the pair of acoustic transducers 332 and 333 are mounted in the terminal body 320 and there is no need to mount an additional speaker or microphone, the fabrication cost of the mobile terminal 300 can be reduced.

When the acoustic transducers 332 and 333 are separated from the terminal body 320, they are operated as wireless earphones, and when the mobile terminal 300 is changed to the call mode in a state that the acoustic transducers 332 and 333 are separated from the terminal body 320, one of the acoustic transducers 332 and 333 is operated as the wireless earphone and the other is operated as the microphone.

A method for controlling the mobile terminal 300 according to the second embodiment of the present invention will be described as follows.

Figure 8:
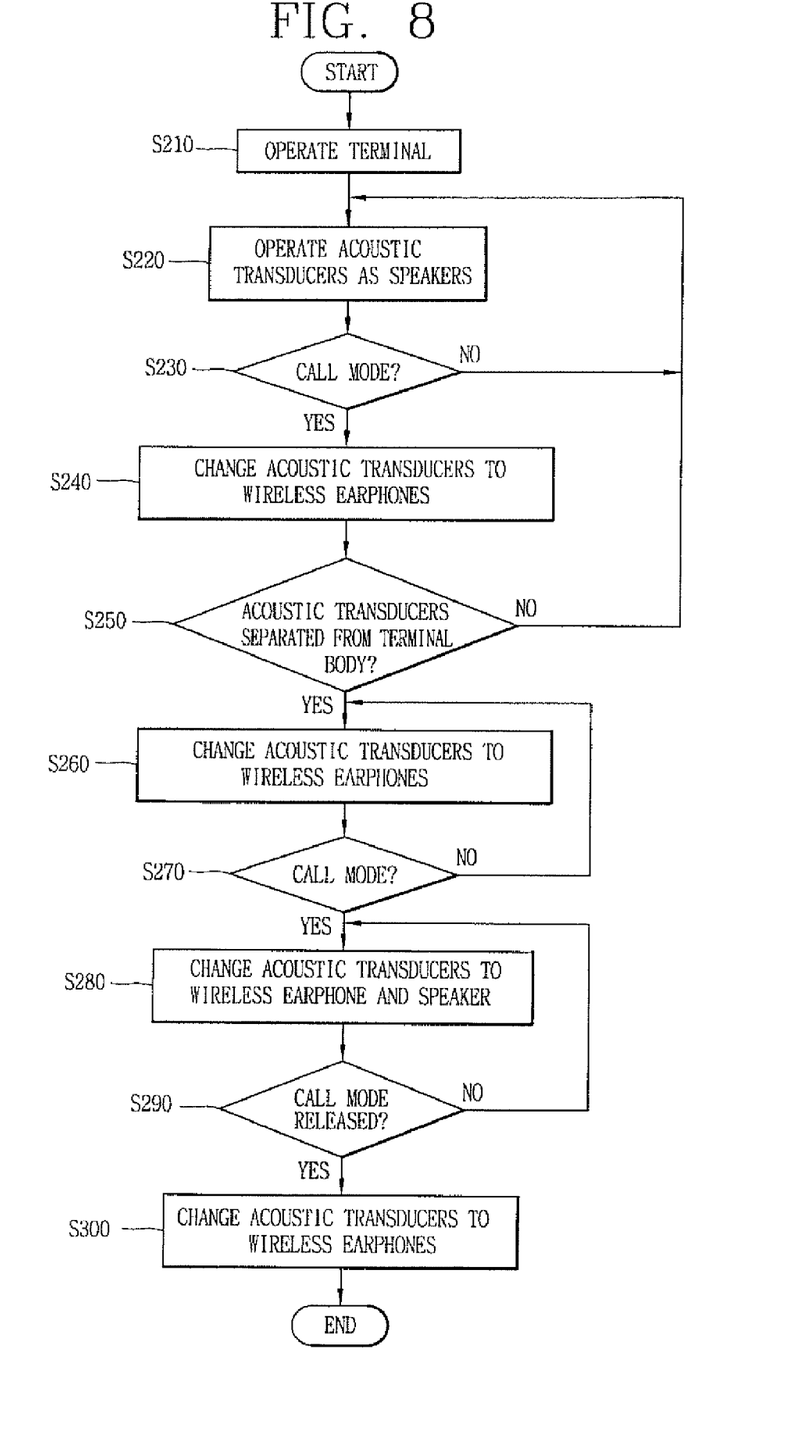
FIG. 8 is a flow chart illustrating a method for controlling the mobile terminal according to the second embodiment of the present invention.

FIG. 8 is a flow chart illustrating the processes of a method for controlling the mobile terminal 300 according to the second embodiment of the present invention.

First, when the pair of acoustic transducers 332 and 333 are received in the receiving parts 386 and 388 of the terminal body 320, the acoustic transducers 332 and 333 and the terminal body 320 are electrically connected and the acoustic transducers 332 and 333 are operated as speakers to generate a sound for allowing a user to enjoy music (steps S210 and S220).

In this state, when the mobile terminal 300 is changed to the call mode (S230), the controller 271 changes the acoustic transducers 332 and 333 to the speaker and the microphone (steps S230 and S240).

For example, when the acoustic transducers 332 and 333 are mounted in the terminal body 320 and the mobile terminal 300 is changed to the call mode (S230), the controller 271 operates one acoustic transducer 332 as the speaker and the other acoustic transducer 333 as the microphone to implement the call mode.

When a call is received and the user recognizes an audible bell sound or a vibration and presses the call key 276 (S230), the controller 271 changes one of the acoustic transducers 332 and 333 to the speaker and the other to the microphone according to a signal applied from the call key 276 (S240).

The acoustic transducers 332 and 333 are used as wireless earphones when the pair of acoustic transducers 332 and 333 are removed from the receiving parts 386 and 388 of the terminal body 320 (S250, S260).

In this configuration, the controller 271 can control the volume of the pair of acoustic transducers 332 and 333 to change them for use as wireless earphones (step S260). While the pair of acoustic transducers 332 and 333 are separated from the terminal body 320 and inserted on the user's ears for performing the wireless earphone function and the terminal 300 is changed to the call mode (S220), the controller 271 operates the pair of acoustic transducers 332 and 333 as the earphone and the microphone (S320).

At this time, the controller 271 operates one of the pair of acoustic transducers 332 and 333 as the wireless earphone and the other as the microphone.

For example, when a call is received, the call signal detection unit 272 detects the received call and applies a corresponding signal to the controller 271. Then, the controller 271 provides an audible signal to the pair of acoustic transducers 332 and 333. The audible signal can be, but is not limited to, a bell sound signal wherein the user is alerted by a certain number of bell sounds or for a certain length of time so that the user recognizes the received call. When the bell sound exceeds a predetermined number of times or when a certain time lapses after the bell sound signal is generated (S290), the controller 271 automatically operates one acoustic transducer 332 as the wireless earphone and the other acoustic transducer 333 as the microphone (S280), to allow the user to automatically receive the call while enjoying music.

Alternately, when the user presses the call key 276 upon listening to the bell signal S270), the controller 271 changes the acoustic transducers 332 and 333 to be operated as the wireless earphone and the microphone according to a signal applied from the call key 276 (S280).

When the user makes a call with the pair of acoustic transducers 332 and 333 operated as the wireless earphones in the ears, the user presses the call key 276 (S270) mounted on the terminal body 320 and controller 271 operates one acoustic transducer 332 as the wireless earphone and the other acoustic transducer 333 as the microphone (S280).

When the call mode ends (S290), the controller 271 changes the pair of acoustic transducers 332 and 333 to the earphones to perform the operation which was carried out in the previous stage of the call mode (step S300).

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile terminal, comprising:
   a terminal body; and
   a pair of acoustic transducers detachably mounted in the terminal body, each of the pair of acoustic transducers comprising:
   a sound input and output unit for converting received sounds into electrical signals to perform a microphone function and outputting sounds to perform a speaker function; and
   a main body part connected to the sound input and output unit, and having a wireless communication module and a battery mounted therein,
   wherein both acoustic transducers operate as speakers when the pair of acoustic transducers are mounted in the terminal body, and the pair of acoustic transducers is configured to change an operational mode such that a first transducer changes operation from a speaker to a microphone in order to perform the microphone function and a second transducer operates as the speaker in order to perform the speaker function when the mobile terminal operates in a call mode.

2. The mobile terminal of claim 1, wherein one of the acoustic transducers is detachably mounted at one side of the terminal body and the other acoustic transducer is detachably mounted at another side of the terminal body.

3. The mobile terminal of claim 1, wherein one of the acoustic transducers operates as a wireless earpiece and a microphone while the other acoustic transducer operates as the wireless earpiece when the pair of acoustic transducers are separated from the terminal body of the mobile terminal operating in a call mode.

4. The mobile terminal of claim 1, further comprising:
   receiving ports formed at the terminal body to receive the acoustic transducers therein, each receiving port comprises a corresponding connection terminal electrically connecting each acoustic transducer and the terminal body.

5. The mobile terminal of claim 4, wherein the connection terminals comprise a charging connection terminal charging the battery of each of the acoustic transducers by using one of the power of the battery mounted in the terminal body and an extra power source connected to the mobile terminal.

6. The mobile terminal of claim 1, further comprising:
   a locking part formed between each acoustic transducer and the corresponding receiving port to prevent the acoustic transducers from being inadvertently released from the receiving ports, the locking part comprising a stopping protrusion disposed on an outer circumferential surface of the acoustic transducer and a stopping groove formed on an inner circumferential surface of the receiving port to allow the stopping protrusion to be stopped therein.

7. The mobile terminal of claim 1, further comprising a control unit controlling the operation of the pair of acoustic transducers as a wireless headset comprising an earphone and a microphone when the mobile terminal is operating in a call mode and the acoustic transducers are separated from the terminal body.

8. The mobile terminal of claim 7, wherein the control unit comprises:
   a separation detection unit detecting separation of at least one of the acoustic transducers from the terminal body;
   a call signal detecting unit detecting whether a call signal is generated; and
   a controller controlling the operation of the acoustic transducers according to signals received from the separation detection unit and the call signal detection unit.

9. A method for controlling a plurality of acoustic transducers in a mobile terminal, each of the plurality of acoustic transducers being configured to perform both a microphone function and a speaker function, the method comprising:

controlling the plurality of acoustic transducers to operate as speakers when the plurality of acoustic transducers are mounted in a body of the mobile terminal;

controlling the plurality of acoustic transducers to operate as wireless earphones when the plurality of acoustic transducers are separated from the body; and changing an operational mode of the plurality of acoustic transducers such that at least one of the plurality of acoustic transducers operates as a wireless earphone and the at least one of the plurality of acoustic transducers operates as a microphone when the mobile terminal is changed to a call mode while the plurality of acoustic transducers are separated from the body.

10. The method of claim 9, wherein the plurality of acoustic transducers are formed as a pair, and when the mobile terminal is changed to the call mode while the acoustic transducers are separated from the terminal body, one of the acoustic transducers is operated as the wireless earphone and the other of the acoustic transducers is operated as the microphone.

11. The method of claim 9, wherein the plurality of acoustic transducers are formed as a pair, and when the mobile terminal is changed to the call mode while the acoustic transducers are separated from the terminal body, one of the acoustic transducers is operated as the wireless earphone and the microphone and the other acoustic transducer is operated as the wireless earphone.

12. The method of claim 9, further comprising:
generating a signal to alert a user when the mobile terminal is changed to a call mode; and
operating each of the plurality of acoustic transducers as one of the wireless earphone and microphone after the user is alerted,
wherein the call signal is one of a certain number of audible sounds, an audible sound for a predetermined length of time and a vibration sound.

13. The method of claim 9, wherein when the mobile terminal is changed to a call mode and a user initiates a call, the plurality of acoustic transducers is operated as the wireless earphone and at least one of the plurality of acoustic transducers is operated as the microphone.

14. The method of claim 9, wherein when the plurality of acoustic transducers are separated from the terminal body, in the call mode, one of the acoustic transducers is operated as the wireless earphone and the other is operated as the microphone according to a user selection.

15. The method of claim 9, wherein when the pair of acoustic transducers are separated from the terminal body, in the call mode, one of the acoustic transducers is operated as both the wireless earphone and the microphone and the other transducer is operated as the wireless earphone according to a user selection.

16. A mobile terminal, comprising:
a terminal body; and
a pair of acoustic transducers detachably mounted in the terminal body, each of the pair of acoustic transducers comprising:
a sound input and an output unit outputting sounds and converting the sounds into electrical signals to perform both a microphone function and a speaker function; and
a main body part connected to the sound input and the output unit, and having a wireless communication module and a battery mounted therein,
wherein the pair of acoustic transducers operate as wireless earpieces when the pair of acoustic transducers are separated from the terminal body, and the pair of acoustic transducers is configured to change an operational mode such that a first acoustic transducer operates as a microphone and a second acoustic transducer operates as a wireless earpiece when the pair of acoustic transducers are separated from the terminal body and the mobile terminal is operating in a call mode.

17. The mobile terminal of claim 16, wherein one transducer of the pair of acoustic transducers is detachably mounted at a first side of the terminal body and the other transducer of the pair of acoustic transducers is detachably mounted at a second side of the terminal body.

18. The mobile terminal of claim 16, wherein one transducer of the pair of acoustic transducers operates as the wireless earpiece and microphone while the other transducer of the pair of acoustic transducers operates as the wireless earpiece when the pair of acoustic transducers is separated from the terminal body of the mobile terminal operating in a call mode.

19. The mobile terminal of claim 16, further comprising:
receiving ports formed at the terminal body to receive the pair of acoustic transducers therein, each receiving port comprises a corresponding connection terminal electrically connecting each of the pair of acoustic transducers and the terminal body.

20. The mobile terminal of claim 19, wherein each of the corresponding connection terminals comprises a charging connection terminal for charging the battery of each of the pair of acoustic transducers by using either power from the battery mounted in the terminal body or an extra power source connected to the mobile terminal.

21. The mobile terminal of claim 19, further comprising:
a locking part formed between each of the pair of acoustic transducers and the corresponding receiving port to prevent the pair of acoustic transducers from being inadvertently released from the receiving ports, the locking part comprising a stopping protrusion disposed on an outer circumferential surface of the acoustic transducer and a stopping groove formed on an inner circumferential surface of the corresponding receiving port to allow the stopping protrusion to be stopped therein.

22. The mobile terminal of claim 16, further comprising:
a control unit controlling the operation of the pair of acoustic transducers as a wireless headset comprising an earphone and a microphone when the mobile terminal is operating in a call mode and the pair of acoustic transducers are separated from the terminal body.

23. The mobile terminal of claim 22, wherein the control unit comprises:
a separation detection unit for detecting separation of at least one of the pair of acoustic transducers from the terminal body;
a call signal detecting unit for detecting whether or not a call signal is generated; and
a controller for controlling the operation of the pair of acoustic transducers according to signals received from the separation detection unit and the call signal detection unit.

* * * * *